US011654911B2

(12) United States Patent
Hongawara et al.

(10) Patent No.: US 11,654,911 B2
(45) Date of Patent: May 23, 2023

(54) POWERTRAIN DEVICE FOR VEHICLE

(71) Applicant: Mazda Motor Corporation, Hiroshima (JP)

(72) Inventors: Narihito Hongawara, Aki-gun (JP); Takuya Sugisawa, Aki-gun (JP); Keitaro Kageyama, Aki-gun (JP); Satoshi Fujikawa, Aki-gun (JP); Hiroki Tanabe, Aki-gun (JP); Shingo Kodama, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 49 days.

(21) Appl. No.: 17/594,453

(22) PCT Filed: Mar. 13, 2020

(86) PCT No.: PCT/JP2020/011010
§ 371 (c)(1),
(2) Date: Oct. 15, 2021

(87) PCT Pub. No.: WO2020/217763
PCT Pub. Date: Oct. 29, 2020

(65) Prior Publication Data
US 2022/0176961 A1 Jun. 9, 2022

(30) Foreign Application Priority Data

Apr. 22, 2019 (JP) .............................. JP2019-081059

(51) Int. Cl.
*B60W 30/18* (2012.01)
*B60W 10/02* (2006.01)
(Continued)

(52) U.S. Cl.
CPC ...... *B60W 30/18027* (2013.01); *B60W 10/02* (2013.01); *B60W 10/06* (2013.01);
(Continued)

(58) Field of Classification Search
CPC .... B60W 10/02; B60W 10/06; B60W 10/196; B60W 30/18027; B60W 30/18054;
(Continued)

(56) References Cited

U.S. PATENT DOCUMENTS

2014/0329639 A1* 11/2014 Matoba .................. B60K 6/547
180/65.265
2015/0367842 A1* 12/2015 Nakanishi ........... B60W 30/192
701/22
(Continued)

FOREIGN PATENT DOCUMENTS

JP       2009180220 A     8/2009
JP       2016065587 A     4/2016
(Continued)

*Primary Examiner* — Edwin A Young
(74) *Attorney, Agent, or Firm* — Alleman Hall Creasman & Tuttle LLP (57) ABSTRACT

The powertrain device for a vehicle includes an engine and an automatic transmission, the automatic transmission includes a plurality of friction fastening elements for selectively switching motive power transmitting paths, a predetermined friction fastening element among the plurality of friction fastening elements is a travel-start friction fastening element performing slip control in a travel start, and the powertrain device includes, between the engine and the automatic transmission, a motive power connection-disconnection clutch which is released at least in an engine start and is fastened earlier than the travel-start friction fastening element in a travel start of the vehicle.

14 Claims, 6 Drawing Sheets

(51) Int. Cl.
  *B60W 10/06*   (2006.01)
  *B60W 10/196*  (2012.01)
  *F16H 59/54*   (2006.01)
  *F16H 59/56*   (2006.01)
  *F16H 59/74*   (2006.01)
  *F16H 61/21*   (2006.01)
  *F16H 63/30*   (2006.01)

(52) U.S. Cl.
  CPC .... *B60W 10/196* (2013.01); *B60W 30/18054* (2013.01); *F16H 59/54* (2013.01); *F16H 59/56* (2013.01); *F16H 59/74* (2013.01); *F16H 61/21* (2013.01); *F16H 63/3026* (2013.01); *B60W 2710/021* (2013.01); *B60W 2710/06* (2013.01); *B60W 2710/18* (2013.01)

(58) Field of Classification Search
  CPC ....... B60W 2710/021; B60W 2710/06; B60W 2710/18; F16H 59/54; F16H 59/56; F16H 59/74; F16H 61/21; F16H 63/3026
  See application file for complete search history.

(56) References Cited

U.S. PATENT DOCUMENTS

| | | | |
|---|---|---|---|
| 2017/0120896 A1* | 5/2017 | Thompson | B60K 6/48 |
| 2019/0271388 A1 | 9/2019 | Ishiyama et al. | |
| 2020/0122708 A1* | 4/2020 | Kucharski | B60W 20/40 |

FOREIGN PATENT DOCUMENTS

| | | | |
|---|---|---|---|
| JP | 2016205468 A | 12/2016 | |
| JP | 2018179068 A | 11/2018 | |
| WO | 2016063857 A1 | 4/2016 | |

\* cited by examiner

FIG. 1

|   |   | CL1 | CL2 | CL3 | BR1 | BR2 |
|---|---|---|---|---|---|---|
| D | FIRST SPEED | O |  |  | O | O(Δ) |
|   | SECOND SPEED |  | O |  | O | O |
|   | THIRD SPEED | O | O |  |  | O |
|   | FOURTH SPEED |  | O | O |  | O |
|   | FIFTH SPEED | O |  | O |  | O |
|   | SIXTH SPEED | O | O | O |  |  |
|   | SEVENTH SPEED | O |  | O | O |  |
|   | EIGHTH SPEED |  | O | O | O |  |
| R | REVERSE SPEED |  |  | O | O | O |

CONVENTIONAL ART

POWERTRAIN DEVICE FOR VEHICLE

TECHNICAL FIELD

The present invention relates to a powertrain device for a vehicle.

BACKGROUND ART

In general, in an automatic transmission installed in a vehicle such as an automobile, motive power transmitting paths of a gear train using a plurality planetary gear mechanisms are switched by selective fastening of a plurality of friction fastening elements such as clutches and brakes. Accordingly, a shift stage corresponding to an operational state of the vehicle is formed.

The friction fastening element of the automatic transmission is usually of a hydraulic type having a plurality of friction plates and pistons pressing the friction plates. The friction fastening element is fastened by supplying a hydraulic pressure to a hydraulic chamber of the piston and pressing the friction plates and is released by not supplying a hydraulic pressure.

In an engine start in a stand-still state of the vehicle, cranking of an engine by a starter is started by key-ON, and a fuel supply is started at a predetermined timing. The engine thereafter starts by ignition of fuel and complete combustion and then shifts to an idling state. In a period between cranking and the complete combustion, the automatic transmission is in a P range or an N range, and the gear train is maintained in a neutral state where motive power is not transmitted.

In an engine start, in order to improve responsiveness in vehicle travel start, the automatic transmission may cause a portion of the plurality of friction fastening elements to be fastened in advance, the plurality of friction fastening elements forming a travel-start shift stage when the engine is shifted to the idling state.

Furthermore, in a travel-start friction fastening element, the piston may be caused in advance to perform a stroke to a state where the piston contacts with the friction plates (a so-called "zero-clearance" state) such that the travel-start friction fastening element is immediately fastened when a travel-start operation by a driver is performed. As a means for causing the travel-start friction fastening element to perform a stroke to the zero-clearance state, it is possible to use a spring that urges the piston in a fastening direction to the extent that motive power is not transmitted. Note that the travel-start friction fastening element is an element that is fastened last among the plurality of friction fastening elements for forming the travel-start shift stage and thereby completes the travel-start shift stage. The travel-start operation by the driver is an operation such as a release of a brake pedal or depressing an accelerator pedal.

In a case where the spring is used, in a start of the engine, the travel-start friction fastening element is in the zero-clearance state. The other friction fastening elements forming the travel-start shift stage are fastened when the engine transits to the idling state, the travel-start friction fastening element is fastened in addition when the travel-start operation by the driver is operated, and the travel-start shift stage is completed. When the travel-start operation is performed, in a travel start, an automatic transmission in which no torque converter is installed may perform a control in which the travel-start friction fastening element is caused to go through a slip state and is thereafter completely fastened. Accordingly, a smooth travel start through a creep state is realized.

Patent Literature 1 discloses an eight-speed automatic transmission including four planetary gear mechanisms and two brakes and three clutches as friction fastening elements. This automatic transmission is configured to form a travel-start shift stage by fastening one of the clutches and the two brakes.

The automatic transmission in Patent Literature 1 can be configured as follows. In other words, in a start of an engine in a P range or an N range, one of the brakes is set to the zero-clearance state by a spring, and the other brake is fastened when the engine is shifted to the idling state. Then, in addition, the clutch is fastened when a switching operation to a D range or an R range is performed, and when the travel-start operation is performed thereafter, the one brake is completely fastened through the slip state. Accordingly, in the automatic transmission, the travel-start shift stage is formed by fastening the three friction fastening elements, and quick and smooth travel-start characteristics can be obtained.

CITATION LIST

Patent Literature

Patent Literature 1: International Publication No. WO 2016/063857

SUMMARY OF INVENTION

Technical Problem

Incidentally, an output of an engine accompanies a rotational fluctuation due to intermittent combustion, and this rotational fluctuation is input to an automatic transmission. This rotational fluctuation becomes particularly large in a period between a time immediately after ignition of fuel in a start of the engine, in which a revolution speed is low, and complete combustion.

In this case, a gear train of the automatic transmission is in a neutral state, a portion of rotational elements are in a free state (free elements). Specifically, a portion of the rotational elements are other rotational elements except input elements coupled with an engine output shaft, output elements coupled with drive wheels, and rotational elements, whose rotations are restrained by the friction fastening elements and which thereby relate to motive power transmission, among rotational elements that are formed by mechanically joining configuration members of planetary gear mechanisms or friction fastening elements and other rotational members together. The free elements work while being linked with other elements in a stopped state or a motive power non-transmitting state. The free elements themselves tend to exhibit the rotational fluctuation in response to the rotational fluctuation from the input element side.

Note that as for the free elements, there are a case where in a neutral state, the friction fastening elements are in a non-engaged state as in a start, an idling condition, or the like and rotations of the free elements are not settled and a case where in a state where a vehicle stands still and a portion of the friction fastening elements to be fastened in a travel start are fastened, rotation of the free elements are restrained.

Meanwhile, when the number of shift stages increases as in the automatic transmission disclosed in Patent Literature 1, the numbers of planetary gear mechanisms and friction fastening elements also increase, and the weight of each of the rotational elements becomes large. The weights of the above free elements increase, and their inertial masses become large. The free elements with large inertial masses do not easily follow when receiving the rotational fluctuation from the input element side and become reaction force elements, and the rotational fluctuation is transmitted to the output element side. This rotational fluctuation is transmitted from an output shaft of the automatic transmission to the drive wheel side and becomes a cause of an occurrence of vehicle-body vibration.

For example, in a case where the inertial masses of a sun gear and a ring gear as the free elements are small, when the rotational fluctuation of the engine is input to a carrier as an input element coupled with an input shaft, the rotational fluctuation of the sun gear and the ring gear occurs in response to the rotational fluctuation of the carrier, and the rotational fluctuation can thereby be absorbed.

Figure 7:
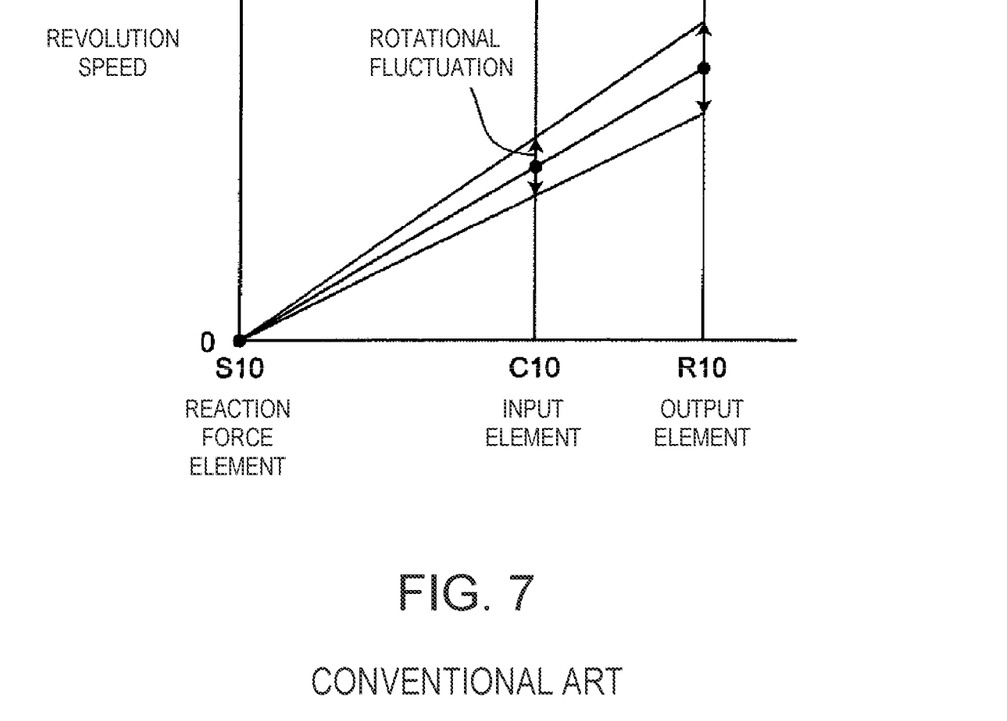
FIG. 7 is an explanatory diagram about transmission of a rotational fluctuation in a planetary gear mechanism in a case where a rotational fluctuation of an engine is input.

However, as illustrated in FIG. 7, for example, in a case where the inertial mass of a sun gear S10 as the free element is large, the sun gear S10 does not easily follow when receiving the rotational fluctuation from a carrier C10 but becomes the reaction force element. Further, the rotational speeds of three configuration elements (the sun gear S10, the carrier C10, and a ring gear R10) of a planetary gear mechanism have a characteristic in which these elements are aligned in one straight line on a velocity diagram, and the rotational fluctuation thus occurs to the ring gear R10.

In a case where the ring gear R10 is an output element coupled with the output shaft of the automatic transmission, the rotational fluctuation of the ring gear R10 is transmitted to the drive wheel side and becomes a cause of an occurrence of the vehicle-body vibration.

In a case where a rotational element with a large inertial mass becomes the free element in the neutral state, such vehicle-body vibration can similarly occur not only in a start of the engine but also in a case where a travel-start friction fastening element is still in a zero-clearance state even after the automatic transmission is operated to a D range or an R range. Further, the same applies to an automatic transmission in which a travel-start shift stage is formed by the fastening of two friction fastening elements.

In a powertrain device for a vehicle, the technique disclosed herein inhibits vehicle-body vibration due to a rotational fluctuation of an engine which occurs in a neutral state in the above engine start, subsequent idling condition, or the like.

Solution to Problem

The technique disclosed herein relates to
a powertrain device for a vehicle, including: an engine; and an automatic transmission, wherein
the automatic transmission includes a plurality of friction fastening elements for selectively switching motive power transmitting paths,
a predetermined friction fastening element among the plurality of friction fastening elements is a travel-start friction fastening element performing slip control in which the travel-start friction fastening element is completely fastened through a slip state in a travel start, and
the powertrain device includes, between the engine and the automatic transmission, a motive power connection-disconnection clutch which is released at least in an engine start and is fastened earlier than the travel-start friction fastening element in a travel start of the vehicle.

Note that "start" mentioned here is a period through which cranking is started by a starter of the engine, combustion of fuel is completed, and then transition to idling is performed.

With this configuration, because the motive power connection-disconnection clutch is released in a start of the engine, a rotational fluctuation of the engine is hindered from being input to the automatic transmission. Even in a case where a rotational element with a large inertial mass is present among rotational elements which become free elements in a neutral state, vehicle-body vibration is prevented from occurring due to transmission of the rotational fluctuation of the engine to an output side.

Because the motive power connection-disconnection clutch is fastened earlier than the travel-start friction fastening element in a travel start of the vehicle, the slip control for the travel-start friction element in a travel start can be performed in a state where a torque is input. A fine slip control becomes possible compared to a case where control is performed in a state where an input side is unstable.

The motive power connection-disconnection clutch may be maintained in a released state in a period in which the automatic transmission is in a neutral state after an engine start and may be fastened in transition to a traveling range.

Even after an engine start (after complete combustion), in a period in which the automatic transmission is in the neutral state, the vehicle-body vibration similar to that in a start might occur depending on the magnitude of the rotational fluctuation of the engine, the sizes of the inertial masses of the free elements of the automatic transmission, and so forth. To handle this, the above configuration enables the motive power connection-disconnection clutch to be maintained in the released state and thereby prevents an occurrence of the vehicle-body vibration in this period.

The plural friction fastening elements may be formed with clutches and brakes, and the travel-start friction fastening element may be a brake.

Because friction plates on one side of the brake are fixed, compared to a clutch in which friction plates on both of input and output sides rotate, the slip control in a travel start can precisely be performed, and better travel-start characteristics can be obtained.

The travel-start friction fastening element may include a piston urging member which forms a zero-clearance state in a non-engaged state.

In this configuration, because the piston urging member causes the piston to perform a stroke in advance to a state where the piston contacts with a friction plate (zero-clearance state), responsiveness for a start of the slip control of the travel-start friction fastening element in a vehicle travel start is improved, and good travel-start responsiveness of the vehicle can be obtained.

Advantageous Effects of Invention

The powertrain device for a vehicle can inhibit vehicle-body vibration due to a rotational fluctuation of an engine which occurs in a neutral state in a start of the engine, a subsequent idling condition, or the like.

DESCRIPTION OF EMBODIMENT

A powertrain device for a vehicle will hereinafter be described with reference to the attached drawings.

Figure 1:
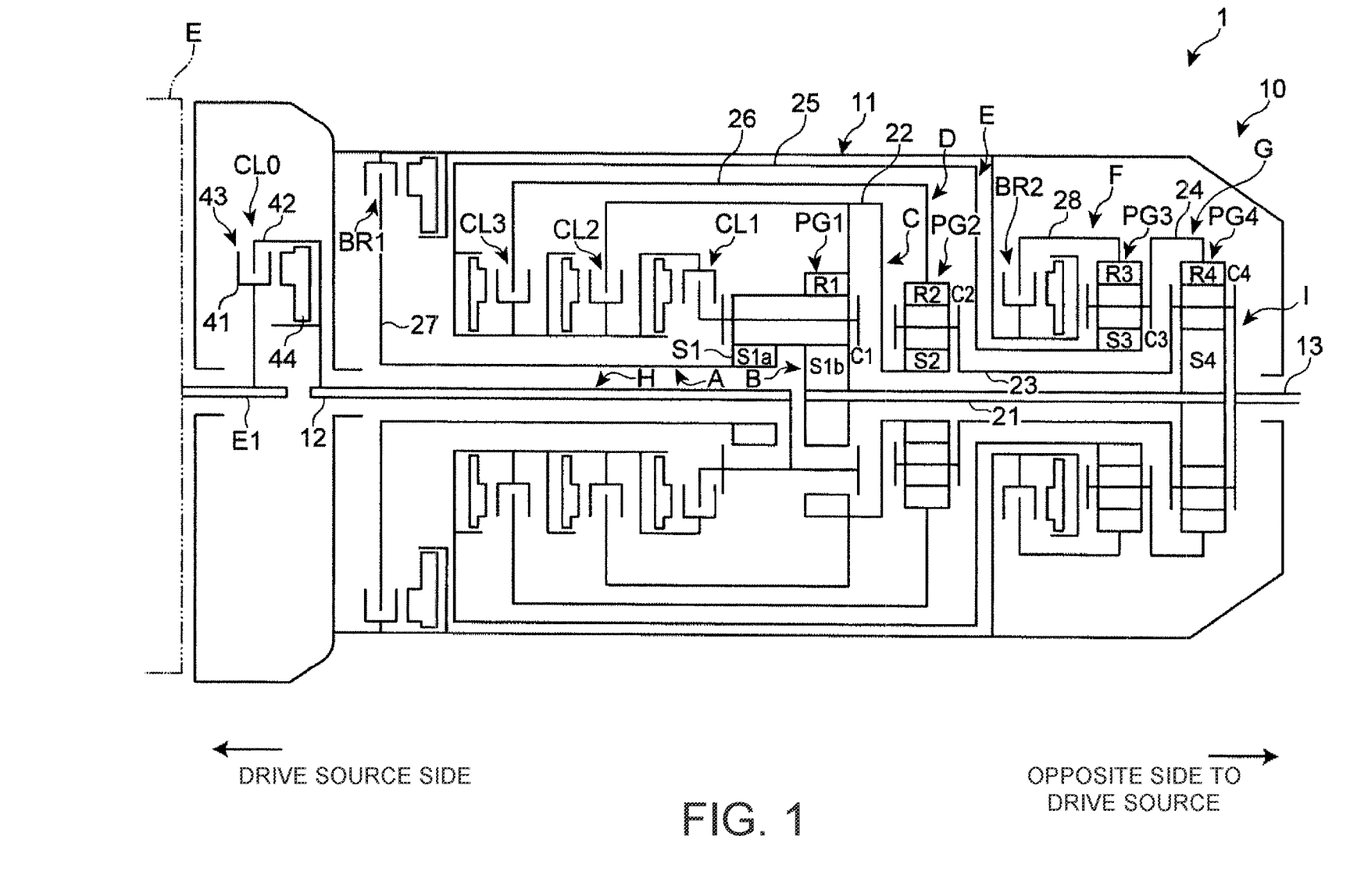
FIG. 1 is a skeleton diagram of an automatic transmission included in a powertrain device for a vehicle according to the present embodiment.

FIG. 1 is a skeleton diagram of a powertrain device 1 for a vehicle. The powertrain device 1 for a vehicle has a drive source such as an engine E and an automatic transmission 10. The engine E and the automatic transmission 10 are coupled together via a motive power connection-disconnection clutch CL0. In the present embodiment, the powertrain device 1 for a vehicle does not include a fluid power transmission device such as a torque converter.

The automatic transmission 10 has, in a transmission casing 11, an input shaft 12 which is capable of being coupled with the drive source and is disposed on the drive source side (the left side in FIG. 1) and an output shaft 13 disposed on an opposite side to the drive source (the right side in FIG. 1). In the automatic transmission 10, the input shaft 12 and the output shaft 13 are arranged on the same axis line. The automatic transmission 10 is of a longitudinal placement type for a front-engine, rear-wheel-drive layout vehicle or the like.

On the axis of the input shaft 12 and the output shaft 13, from the drive source side toward the opposite side to the drive source, first, second, third, and fourth planetary gear sets (hereinafter simply referred to as "first, second, third, and fourth gear sets") PG1, PG2, PG3, and PG4 are disposed.

In the transmission casing 11, a first clutch CL1 is disposed on the drive source side of the first gear set PG1, a second clutch CL2 is disposed on the drive source side of the first clutch CL1, and a third clutch CL3 is disposed on the drive source side of the second clutch CL2. Further, a first brake BR1 is disposed on the drive source side of the third clutch CL3, and a second brake BR2 is disposed on the drive source side of the third gear set PG3 and on the opposite side to the drive source of the second gear set PG2. Note that the automatic transmission 10 includes a hydraulic circuit (not illustrated) for fastening or releasing above-described friction elements.

Each of the first, second, third, and fourth gear sets PG1, PG2, PG3, and PG4 is a single-pinion type. In other words, in each of the first, second, third, and fourth gear sets PG1, PG2, PG3, and PG4, a pinion supported by a carrier directly meshes with a sun gear and a ring gear. The first, second, third, and fourth gear sets PG1, PG2, PG3, and PG4 respectively have sun gears S1, S2, S3, and S4, ring gears R1, R2, R3, and R4, and carriers C1, C2, C3, and C4.

The first gear set PG1 is a double-sun-gear type in which the sun gear S1 is divided into two portions in an axis direction. The sun gear S1 has a first sun gear S1a arranged on the drive source side and a second sun gear S1b arranged on the opposite side to the drive source. The first and second sun gears S1a and S1b have the same number of teeth and mesh with the same pinion supported by the carrier C1. Accordingly, the first and second sun gears S1a and S1b always rotate at the same time and at the same speed.

In the automatic transmission 10, the sun gear S1 of the first gear set PG1, specifically, the second sun gear S1b and the sun gear S4 of the fourth gear set PG4 are always coupled together via a first motive power transmitting member 21; the ring gear R1 of the first gear set PG1 and the sun gear S2 of the second gear set PG2 are always coupled together via a second motive power transmitting member 22; the carrier C2 of the second gear set PG2 and the carrier C4 of the fourth gear set PG4 are always coupled together via a third motive power transmitting member 23; and the carrier C3 of the third gear set PG3 and the ring gear R4 of the fourth gear set PG4 are always coupled together via a fourth motive power transmitting member 24.

The input shaft 12 is always coupled with the carrier C1 of the first gear set PG1 through a portion between the first sun gear S1a and the second sun gear S1b, and the output shaft 13 is always coupled with the carrier C4 of the fourth gear set PG4.

The first clutch CL1 is disposed between the input shaft 12 and the carrier C1 of the first gear set PG1, and the sun gear S3 of the third gear set PG3 so as to connect and disconnect them. The second clutch CL2 is disposed between the ring gear R1 of the first gear set PG1 and the sun gear S2 of the second gear set PG2, and the sun gear S3 of the third gear set PG3 so as to connect and disconnect them. The third clutch CL3 is disposed between the ring gear R2 of the second gear set PG2 and the sun gear S3 of the third gear set PG3 so as to connect and disconnect them.

The first to third clutches CL1 to CL3 respectively connect and disconnect the sun gear S3 of the third gear set PG3 with and from: the carrier C1 of the first gear set PG1; the ring gear R1 of the first gear set PG1 and the sun gear S2 of the second gear set PG2; and the ring gear R2 of the second gear set PG2. Thus, a drum member of the first clutch CL1, a hub member of the second clutch CL2, and a hub member of the third clutch CL3 are coupled with the sun gear S3 of the third gear set PG3 via a fifth motive power transmitting member 25.

A hub member of the first clutch CL1 is coupled with the carrier C1 of the first gear set PG1 via a sixth motive power transmitting member 26. A drum member of the second clutch CL2 is coupled with the ring gear R1 of the first gear set PG1 and the sun gear S2 of the second gear set PG2 via the above-described second motive power transmitting member 22. The second motive power transmitting member 22 couples the ring gear R1 of the first gear set PG1 with the sun gear S2 of the second gear set PG2. A drum member of the third clutch CL3 is coupled with the ring gear R2 of the second gear set PG2 via a seventh motive power transmitting member 27.

The first brake BR1 is disposed between the transmission casing 11 and the sun gear S1 of the first gear set PG1, specifically, the first sun gear S1a so as to connect and disconnect them. The second brake BR2 is disposed between the transmission casing 11 and the ring gear R3 of the third gear set PG3 so as to connect and disconnect them.

A hub member of the first brake BR1 is coupled with the first sun gear S1a of the first gear set PG1 via the seventh motive power transmitting member 27. A drum member of a second brake BR2 is coupled with the ring gear R3 of the third gear set PG3 via an eighth motive power transmitting member 28.

The automatic transmission 10 includes first to ninth rotational elements A to I in which configuration members of the first to fourth gear sets PG1 to PG4 and the plurality of friction fastening elements CL1 to CL3, BR1, and BR2 (for example, the ring gears, the sun gears, the carriers, the drum members and hub members of the friction fastening elements, and friction plates to be fitted in those) are integrally joined to the first to seventh motive power transmitting members 21 to 27 which make coupling among the configuration members.

Specifically, the first rotational element A is configured with the first sun gear S1$a$ of the first gear set PG1, the seventh motive power transmitting member 27, and the hub member of the first brake BR1. The second rotational element B is configured with the second sun gear S1$b$ of the first gear set PG1, the fourth gear set PG4, the first motive power transmitting member 21, and the sun gear S4. The third rotational element C is configured with the ring gear R1 of the first gear set PG1, the second motive power transmitting member 22, the sun gear S2 of the second gear set PG2, and the drum member of the second clutch CL2. The fourth rotational element D is configured with the ring gear R2 of the second gear set PG2, the sixth motive power transmitting member 26, and the drum member of the third clutch CL3. The fifth rotational element E is configured with the sun gear S3 of the third gear set PG3, the fifth motive power transmitting member 25, and the first to third clutches CL1 to CL3. The sixth rotational element F is configured with the ring gear R3 of the third gear set PG3, the eighth motive power transmitting member 28, and the drum member of a brake 2. The seventh rotational element G is configured with the ring gear R4 of the fourth gear set PG4, the fourth motive power transmitting member 24, and a third carrier C3. The eighth rotational element H is configured with the input shaft 12 and the carrier C1 of the first gear set PG1 and is the input element in the present embodiment. The ninth rotational element I is configured with the output shaft 13, the carrier C4 of the fourth gear set PG4, the third motive power transmitting member 23, and the carrier C2 of the second gear set PG2 and is the output element of the present embodiment.

Figure 2:
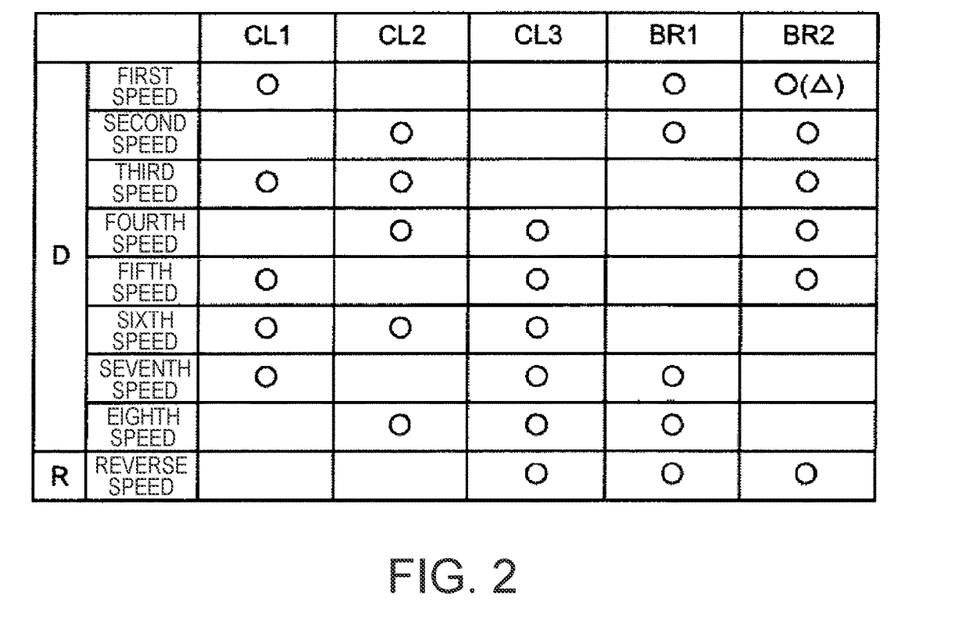
FIG. 2 is a schematic diagram of a second brake of the automatic transmission and a periphery thereof in the present embodiment.

In the above configuration, as illustrated in FIG. 2, the automatic transmission 10 forms first to eighth speeds in a D range and a reverse speed in an R range by combinations of engaged states of the first clutch CL1, the second clutch CL2, the third clutch CL3, the first brake BR1, and the second brake BR2.

In the automatic transmission 10, a slip control is performed for the second brake BR2 which is fastened at the first speed shift stage in a travel start. The second brake BR2 is an example of a travel-start friction fastening element of the automatic transmission. In the following, this brake BR2 will be described.

Figure 3:
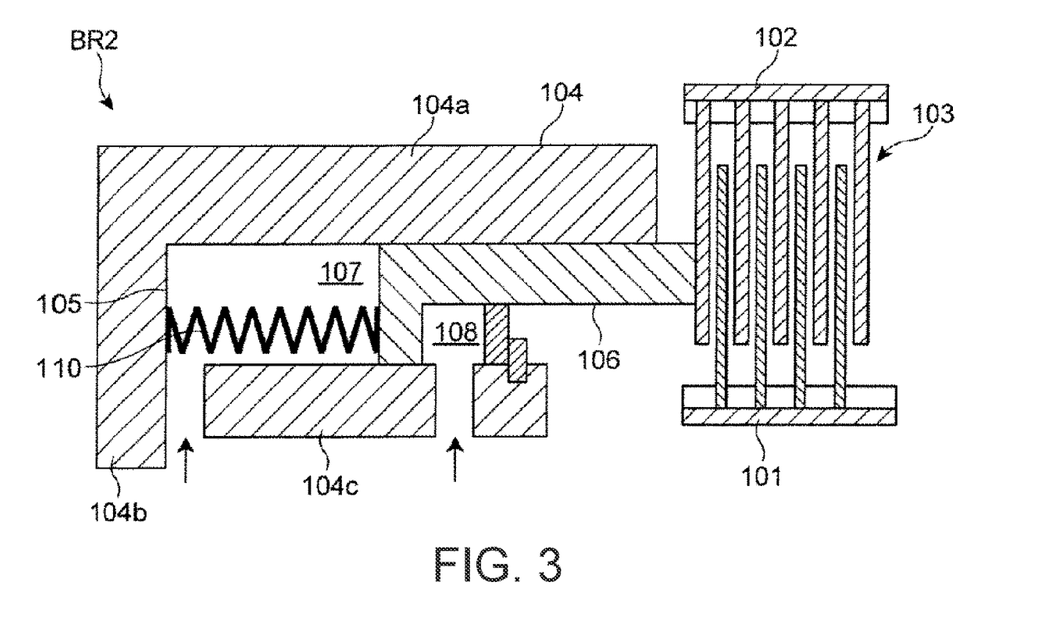
FIG. 3 is a fastening table of friction fastening elements of the automatic transmission in the present embodiment.

FIG. 3 illustrates a schematic diagram of the second brake BR2 of the automatic transmission 10 and a periphery thereof. As illustrated in FIG. 3, the second brake BR2 has a plurality of friction plates 103 and a piston 106. The plurality of friction plates 103 are arranged between a hub member 101 and a drum member 102. The piston 106 is fitted in a cylinder 105 formed with an outer tubular portion 104$a$, a flange portion 104$b$, and an inner tubular portion 104$c$ of a housing 104 as a portion of the transmission casing.

The second brake BR2 also has a fastening hydraulic chamber 107 and a releasing hydraulic chamber 108. The fastening hydraulic chamber 107 is supplied with hydraulic oil for fastening which urges the piston 106 in a fastening direction. The releasing hydraulic chamber 108 is supplied with hydraulic oil for releasing which urges the piston 106 in a releasing direction. A spring 110 is arranged in the fastening hydraulic chamber 107. The spring 110 urges the piston 106 in the fastening direction.

When the second brake BR2 is fastened from a released state, the second brake BR2 first becomes a zero-clearance state. The zero-clearance state denotes a state where the position of the piston 106 becomes a zero-clearance position in which the piston 106 contacts or almost contacts with the friction plate 103 without pressing the plurality of friction plates 103. In detail, a releasing hydraulic pressure is discharged from the releasing hydraulic chamber 108, the piston 106 receives an urging force of the spring 110 and moves in the fastening direction to a free length of the spring 110, and the position of the piston 106 becomes the zero-clearance position.

Then, when a fastening hydraulic pressure is supplied to the fastening hydraulic chamber 107 in the zero-clearance state, the piston 106 is urged in the fastening direction by the fastening hydraulic pressure supplied to the fastening hydraulic chamber 107 and moves, the piston 106 pushes the plural friction plates 103, and the position of the piston 106 becomes a fastening position in which the plural friction plates 103 becomes incapable of relative rotation. Consequently, the second brake BR2 becomes the engaged state.

On the other hand, when the second brake BR2 is released from the engaged state, the fastening hydraulic pressure is discharged from the fastening hydraulic chamber 107, and the releasing hydraulic pressure is supplied to the releasing hydraulic chamber 108. The piston 106 is urged in the releasing direction as the opposite side to the drive source by the releasing hydraulic pressure supplied to the releasing hydraulic chamber 108 and moves, and the second brake BR2 becomes the released state through the zero-clearance state.

In the second brake BR2, the spring 110 can precisely move the piston 106 from a released position to the zero-clearance position. Note that it is possible to perform a pre-charge of hydraulic oil to the fastening hydraulic chamber 107 such that the piston 106 quickly moves when the releasing hydraulic pressure is discharged from the releasing hydraulic chamber 108 in the released state and the piston 106 is moved in the fastening direction.

As described above, the slip control is performed for the second brake BR2 in a travel start of the vehicle. When the second brake BR2 is fastened, a hydraulic pressure lower than the fastening hydraulic pressure is supplied to the fastening hydraulic chamber 107, the plurality of friction plates 103 are thereby caused to become a slip state, the fastening hydraulic pressure is thereafter supplied to the fastening hydraulic chamber 107, and the plurality of friction plates 103 are fastened. On the other hand, when the second brake BR2 is released, a hydraulic pressure lower than the releasing hydraulic pressure is supplied to the releasing hydraulic chamber 108, the plurality of friction plates 103 are thereby caused to become the slip state, the releasing hydraulic pressure is thereafter supplied to the releasing hydraulic chamber 108, and the plurality of friction plates 103 are released from fastening.

In the second brake BR2, compared to a case where the piston 106 is moved from the released position to the zero-clearance position by a hydraulic pressure, the spring 110 can precisely move the piston 106 from the released position to the zero-clearance position.

In the present embodiment, as described above, in order to avoid transmission of a rotational fluctuation of the engine E in a start to the output element side, the motive power connection-disconnection clutch CL0 is provided between the engine E and the automatic transmission 10.

The motive power connection-disconnection clutch CL0 is a so-called normally open type hydraulic clutch. The motive power connection-disconnection clutch CL0 is fastened by supplying a hydraulic pressure to a piston and is released by not supplying a hydraulic pressure. The motive power connection-disconnection clutch CL0 is disposed on the drive source side of the first brake BR1 and between an output shaft E1 of the engine E and the input shaft 12 of the automatic transmission 10 so as to connect and disconnect them.

The motive power connection-disconnection clutch CL0 has a hub member 41, a drum member 42, a plurality of friction plates 43, and a piston 44. The hub member 41 is joined to the output shaft E1 of the engine E. The drum member 42 is arranged on the opposite side to the drive source of the hub member 41 and is joined to the input shaft 12 of the automatic transmission 10. The plurality of friction plates 43 are arranged to be aligned in the axis direction between the hub member 41 and the drum member 42. The piston 44 is arranged on the opposite side to the drive source of the plurality of friction plates 43 and fastens the plurality of friction plates 43.

Next, a description will be made about hydraulic pressure control to be executed in the automatic transmission 10 in a travel start of the vehicle. Although not illustrated, the powertrain device 1 for a vehicle according to the present embodiment includes the automatic transmission 10, a hydraulic circuit, and a control unit. The hydraulic circuit is used for fastening-releasing control of the motive power connection-disconnection clutch CL0. The control unit controls an action of the hydraulic circuit.

The control unit outputs control signals to a plurality of solenoid valves provided to the hydraulic circuit based on various kinds of input signals. Accordingly, opening and closing or an output pressure of each of the solenoid valves are controlled in accordance with a selected range or a traveling state of the vehicle. Each of the friction fastening elements CL1 to CL3, BR1, and BR2 is fastened such that each shift stage is realized in accordance with a fastening table in FIG. 2. Further, hydraulic pressure supply to the motive power connection-disconnection clutch CL0 is controlled, and motive power connection-disconnection control for connecting and disconnecting the engine E and the automatic transmission 10 is thereby performed.

To the control unit, signals necessary for a gear-shifting operation from sensors such as an ignition switch sensor, an engine speed sensor, a range sensor, an accelerator sensor, and a brake pedal sensor are input. The ignition switch sensor detects ON and OFF signals of an ignition switch. The engine speed sensor detects an engine speed. The range sensor detects a range of the transmission. The accelerator sensor detects a pedaling amount of an accelerator pedal (accelerator opening). The brake pedal sensor detects ON and OFF signals of a brake pedal.

In the present embodiment, in addition to the signals of the above sensors, signals of a hydraulic pressure sensor detecting the engaged state of the first brake BR1 forming a first speed stage, a hydraulic pressure sensor detecting the engaged state of the first clutch CL1, a hydraulic pressure sensor detecting the engaged state of the motive power connection-disconnection clutch CL0 for controlling connection and disconnection of the engine E and the automatic transmission 10, and so forth are input. The first brake BR1 inhibits the rotation fluctuation of the engine E in a start, which is input to the automatic transmission 10.

Next, a description will be made about one example of a control action by the control unit for the automatic transmission 10 and the motive power connection-disconnection clutch CL0 about an engine start to a travel start with reference to FIG. 4 to FIG. 6. Note that as an initial state at a time when the vehicle stands still before an engine start, the range sensor detects a P range, the brake pedal is ON, and all of the friction fastening elements CL1 to CL3, BR1, and BR2 and the motive power connection-disconnection clutch CL0 are set to the released state.

Figure 4:
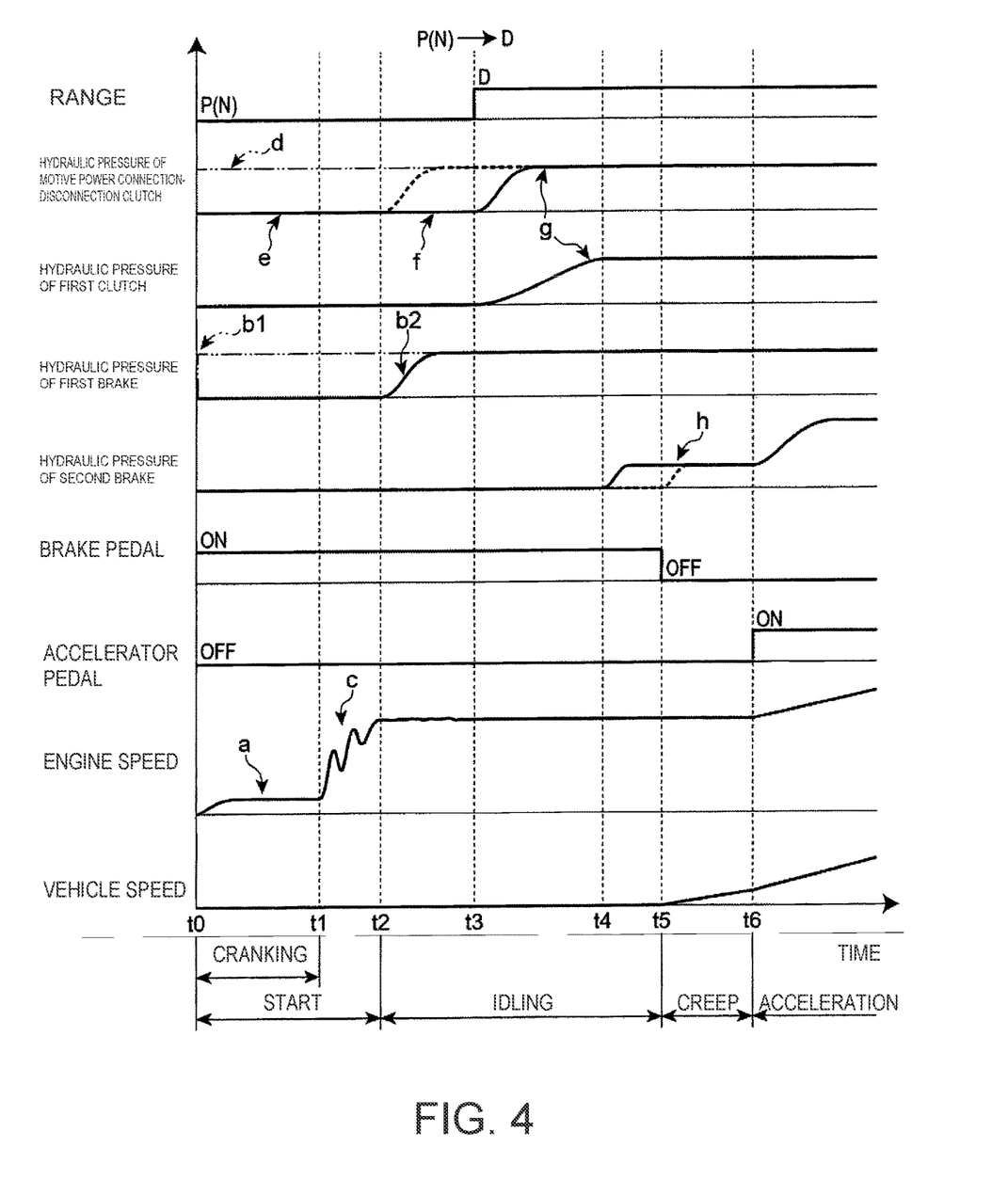
FIG. 4 is a time chart illustrating one example of time changes of various kinds of elements from an engine start to a travel start of the vehicle.

As illustrated in FIG. 4, for example, at a time point t0 when the engine E is turned ON (key-ON) by a push-button start, as indicated by an arrow a in FIG. 4, a starter motor (not illustrated) or the like cranks the engine E, and a start of the engine E starts.

In the present embodiment, when the engine E is turned ON by the push-button start, a fastening instruction of the first brake BR1 is output from the control unit to the hydraulic circuit (arrow b1). Note that as indicated by an arrow b2 in FIG. 4, the first brake BR1 is supplied with a hydraulic pressure and is fastened at a time point when a hydraulic pressure of an oil pump reaches a predetermined pressure (a pressure necessary for fastening of the friction fastening element). Note that the oil pump is driven by the engine.

In a predetermined time period after a start of cranking, fuel is injected into a combustion chamber of the engine E, and the fuel is ignited at a time point t1 when the number of crankings reaches a predetermined value and a predetermined crank angle position is established. In a period from the ignition to a time point t2 when complete combustion occurs after a predetermined time, the engine speed rises from very low revolutions (for example, 100 rpm to 200 rpm) by the cranking to idling revolutions (for example, 600 rpm).

As indicated by an arrow c in FIG. 4, an output of the engine E accompanies the rotational fluctuation due to intermittent combustion, and this rotational fluctuation is input to the automatic transmission 10. This rotational fluctuation becomes particularly large in a period between a time immediately after ignition of fuel in a start of the engine, in which a revolution speed is low, and the complete combustion in the engine E.

Here, a description will be made about transmission of the rotational fluctuation of the engine E, the rotational fluctuation being input to the automatic transmission 10 in an engine start, in a case where for example, as indicated by imaginary lines in FIG. 5, the motive power connection-disconnection clutch CL0 is not disposed between the engine E and the automatic transmission 10, in other words, the output shaft E1 of the engine E is directly coupled with the input shaft 12 of the automatic transmission 10 (see an arrow d in FIG. 4).

Figure 5:
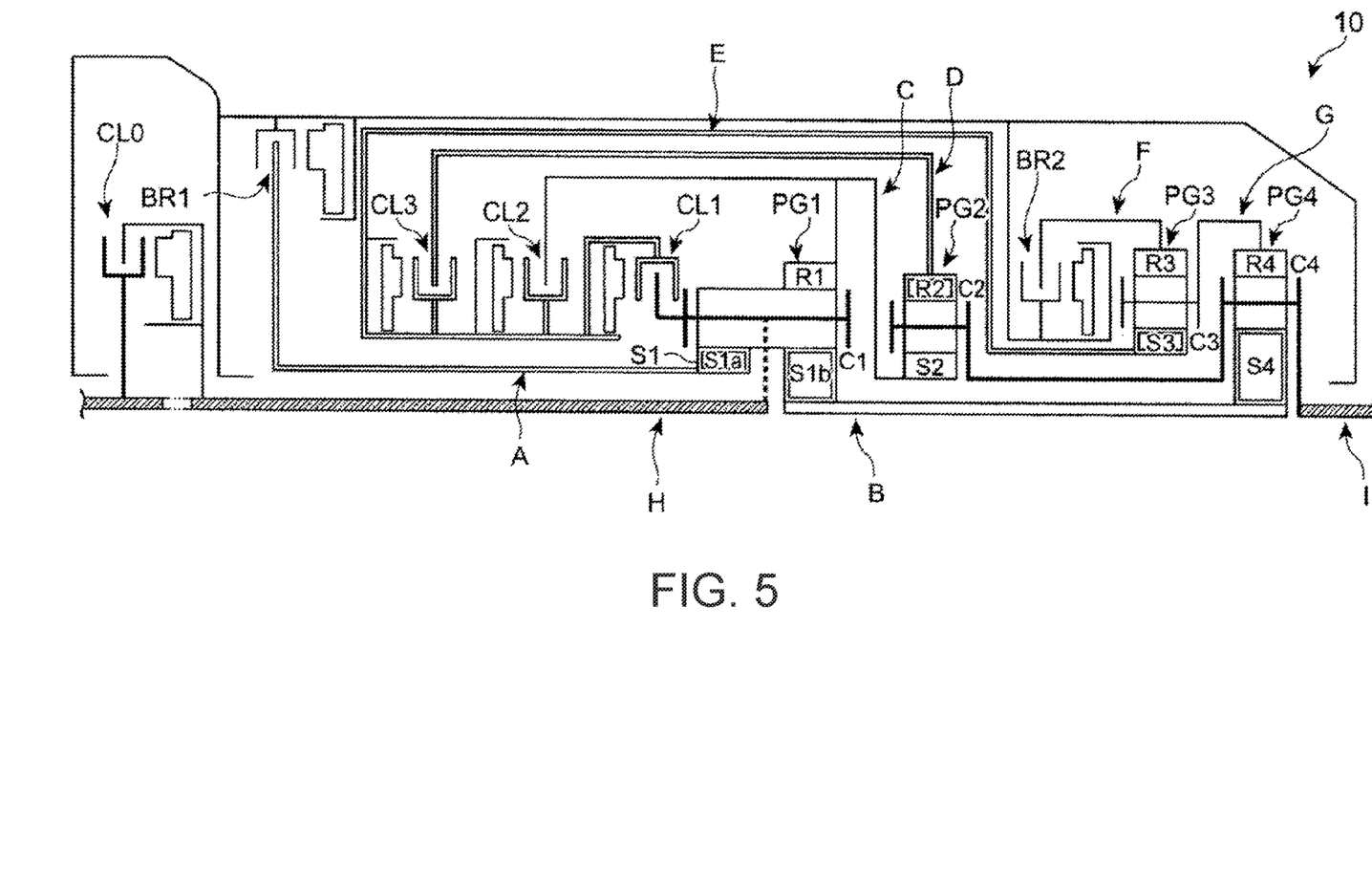
FIG. 5 is a skeleton diagram of the automatic transmission which illustrates states of first to ninth rotation elements in a start of an engine in the present embodiment.

As illustrated in FIG. 5, because any of the plural friction fastening elements CL1 to CL3, BR1, and BR2 of the automatic transmission 10 is not fastened, the first to seventh rotational elements A to G become free elements.

The rotational fluctuation of the engine E which is input to the automatic transmission 10 is transmitted from the input shaft 12 to the carrier C1 of the first gear set PG1, and the rotational fluctuation occurs to the carrier C1. The rotational fluctuation of the carrier C1 is transmitted to the first sun gear S1*a* configuring the first rotational element A, the second sun gear S1*b* configuring the second rotational element B, and the ring gear R1 configuring the third rotational element C, the first to third rotational elements A to C being the free elements.

The first rotational element A and the second rotational element B integrally rotate and have large inertial masses due to the eighth motive power transmitting member 28 and the first motive power transmitting member 21 which extend in a front-rear direction from the drive source side to the opposite side to the drive source. On the other hand, because the third rotational element C has a small inertial mass compared to the first and second rotational elements A and B, in the first gear set PG1, the first rotational element A and the second rotational element B become the reactional force elements as indicated by double lines.

As a result, the rotational fluctuation of the carrier C1 is transmitted to the ring gear R1 configuring the third rotational element C, and the rotational fluctuation occurs to the ring gear R1 and the sun gear S2 of the second gear set PG2 which is integrally joined to the ring gear R1.

The rotational fluctuation of the sun gear S2 as an input element of the second gear set PG2 is transmitted to the carrier C2 of the second gear set PG2 which configures an output element and to the ring gear R2 of the second gear set PG2 which configures the fourth rotational element D via the carrier C2.

The ring gear R2 does not follow the rotational fluctuation of the sun gear S2 but acts as the reaction force element as indicated by the double lines due to the inertial mass of the fourth rotational element D. The rotational fluctuation of the sun gear S2 is not absorbed but is transmitted to the carrier C2, the carrier C4 of the fourth gear set PG4, and the output shaft 13 which configures the output element I. Accordingly, the rotational fluctuation occurs in the output element I (in other words, the carrier C2 of the second gear set PG2, the carrier C4 of the fourth gear set PG4, and the output shaft 13). As a result, the rotational fluctuation of the output element I is transmitted from the output shaft 13 to a drive wheel side and causes vehicle-body vibration.

The rotational fluctuation of the carrier C4 of the fourth gear set PG4 is transmitted to the sun gear S4 of the fourth gear set PG4 and the ring gear R4 configuring the fourth rotational element G. The inertial masses of the first rotational element A and the second rotational element B are large compared to the inertial mass of the seventh rotational element G. Thus, the sun gear S4 does not follow the rotational fluctuation of the carrier C4 but becomes the reaction force element as indicated by the double lines. As a result, the rotational fluctuation of a carrier G4 is transmitted to the ring gear R4 as the output element of the fourth gear set PG4 and tends to cause the rotational fluctuation in the ring gear R4 and the carrier C3 of the third gear set PG3 which is integrally joined to the ring gear R4.

The rotational fluctuation of the carrier C3 of the third gear set PG3 is transmitted to the sun gear S3 and the ring gear R3 of the third gear set PG3. Due to the inertial mass of the fifth rotational element E, the sun gear S3 of the third gear set PG3 does not follow the input rotational fluctuation but acts as the reaction force element as indicated by the double lines. In a case where a pushing force of the spring 110 for zero-preload contact of the second brake BR2 is large, because rotation of the sixth rotation element F including the drum member of the second brake BR2 is restricted by this spring 110, the sixth rotational element F does not follow the rotational fluctuation input from the sun gear S3.

Accordingly, because the ring gear R3 and the sun gear S3 are in a fixed state in the third gear set PG3, the carrier C3 and the ring gear R4 of the fourth gear set PG4 which is integrally joined to the carrier C3 are also fixed. That is, the fifth to seventh rotational elements E to G act as reaction force elements against the output element I and thus cannot absorb the rotational fluctuation input to the carrier C4 of the fourth gear set PG4.

As a result, as described above, because the rotational fluctuation of the carrier C4 of the fourth gear set PG4 is not absorbed by the sun gear S4 side either, the rotational fluctuation is transmitted to the drive wheel side via the output shaft 13 and causes the vehicle-body vibration.

On the other hand, in the present embodiment, as illustrated in FIG. 5, the motive power connection-disconnection clutch CL0 is arranged between the engine E and the automatic transmission 10, and at least in a start of the engine E (a period of t0 to t2 from key-ON to complete combustion), the motive power connection-disconnection clutch CL0 is set to the released state as indicated by an arrow e in FIG. 4. Accordingly, because the rotational fluctuation of the engine E is not transmitted to the automatic transmission 10, the vehicle-body vibration is prevented from occurring due to transmission of the rotational fluctuation of the engine E from an output side to the drive wheel side via the automatic transmission 10.

As illustrated in FIG. 4, after a start of the engine (after complete combustion), although the engine E performs idling revolutions, the rotational fluctuation of the engine E which is smaller than that in a start occurs even in an idling condition. In the idling condition, as described above, because the hydraulic pressure of a mechanical oil pump is elevated, the first brake BR1 becomes the engaged state (the arrow b2 in FIG. 4).

Here, a description will be made about transmission of the rotational fluctuation of the engine E, the rotational fluctuation being input to the automatic transmission 10 in the idling condition, in a case where for example, as indicated by imaginary lines in FIG. 6, the motive power connection-disconnection clutch CL0 is not disposed between the engine E and the automatic transmission 10 (in other words, the output shaft E1 of the engine E is directly coupled with the input shaft 12 of the automatic transmission 10) (see the arrow d in FIG. 4).

Figure 6:
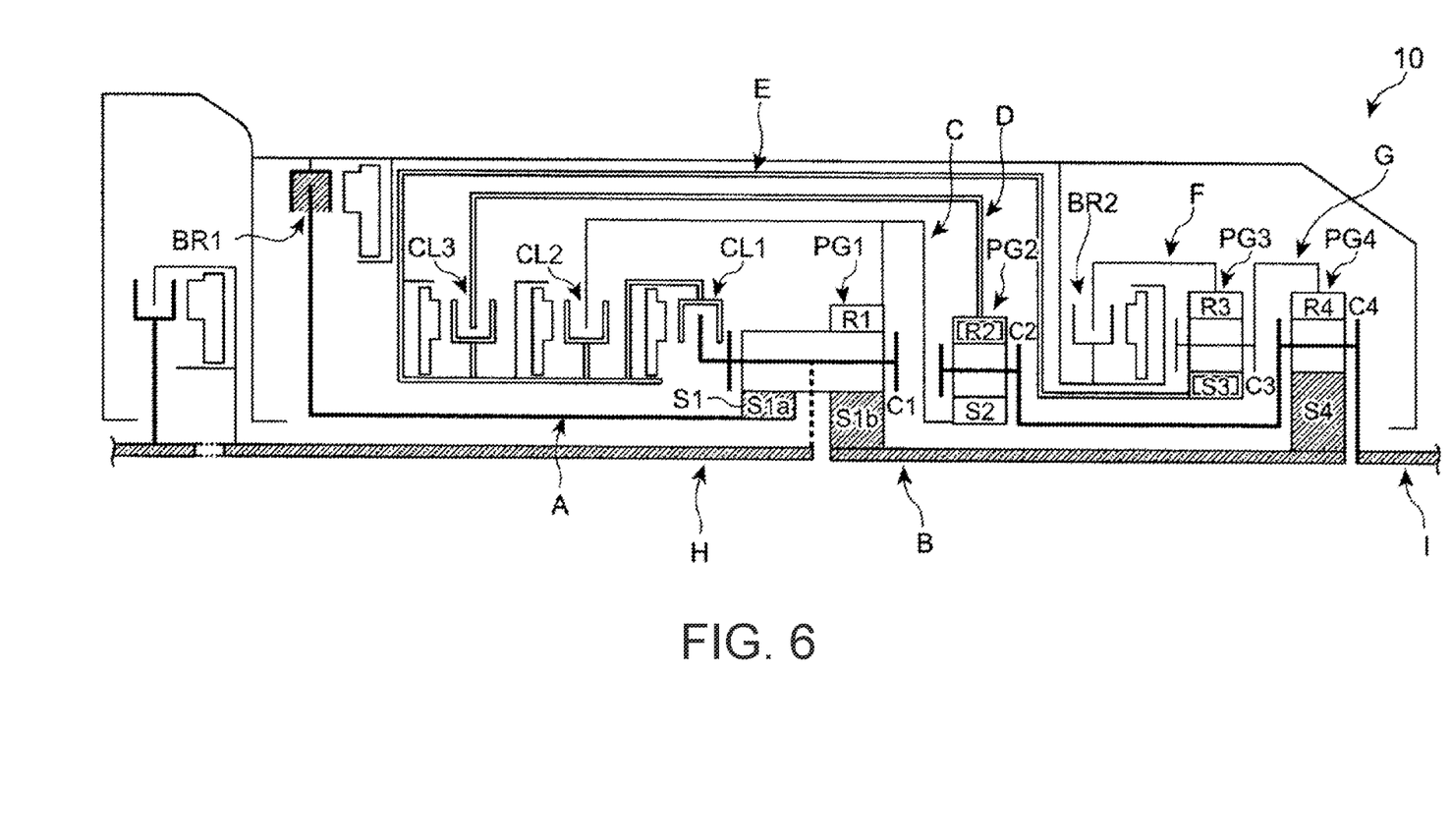
FIG. 6 is a skeleton diagram of the automatic transmission which illustrates states of the first to ninth rotation elements in an idling condition in the present embodiment.

As illustrated in FIG. 6, because the first brake BR1 is fastened in the idling condition, the first and second rotational elements A and B are fixed, and the carrier C1 as the input element and the sun gear S1 in the first gear set PG1 are fixed. Thus, the ring gear R1 of the first gear set PG1 becomes the output element. Consequently, the third rotational element C including the ring gear R1 becomes a rotation-restrained free element whose rotation is restrained but which does not transmit motive power, and the fourth to seventh rotational elements D to G maintain a free element state.

Similarly to a start, the rotational fluctuation of the engine E which is input to the automatic transmission 10 is transmitted from the input shaft 12 to the carrier C1 of the first gear set PG1, and the rotational fluctuation occurs in the carrier C1. Because the first and second rotational elements A and B are fixed, even when the rotational fluctuation of the carrier C1 is transmitted, the rotational fluctuation does not occur thereto. The rotational fluctuation of the carrier C1 is transmitted to the ring gear R1 configuring the third rotational element C, and the rotational fluctuation occurs to the ring gear R1 and the sun gear S2 of the second gear set PG2 which is integrally joined to the ring gear R1.

The rotational fluctuation of the sun gear S2 as the input element of the second gear set PG2 is transmitted to the carrier C2 of the second gear set PG2 which configures the output element and to the ring gear R2 of the second gear set PG2 which configures the fourth rotational element D via the carrier C2.

The ring gear R2 does not follow the rotational fluctuation of the sun gear S2 but acts as the reaction force element as indicated by the double lines due to the inertial mass of the fourth rotation element D. Thus, the rotational fluctuation of the sun gear S2 is not absorbed but is transmitted to the carrier C2, the carrier C4 of the fourth gear set PG4, and the output shaft 13 which configures the output element I. Accordingly, the rotational fluctuation occurs in the output element I (in other words, the carrier C2 of the second gear set PG2, the carrier C4 of the fourth gear set PG4, and the output shaft 13). As a result, the rotational fluctuation of the output element I is transmitted from the output shaft 13 to the drive wheel side and causes the vehicle-body vibration.

The rotational fluctuation of the carrier C4 of the fourth gear set PG4 is transmitted to the sun gear S4 of the fourth gear set PG4 and the ring gear R4 configuring the fourth rotational element G. The inertial masses of the first rotational element A and the second rotational element B are large compared to the inertial mass of the seventh rotational element G. Thus, the sun gear S4 does not follow the rotational fluctuation of the carrier C4 but becomes the reaction force element as indicated by the double lines. As a result, the rotational fluctuation of the carrier G4 is transmitted to the ring gear R4 as the output element of the fourth gear set PG4 and tends to cause the rotational fluctuation in the ring gear R4 and the carrier C3 of the third gear set PG3 which is integrally joined to the ring gear R4.

The rotational fluctuation of the carrier C3 of the third gear set PG3 is transmitted to the sun gear S3 and the ring gear R3 of the third gear set PG3. Due to the inertial mass of the fifth rotation element E, the sun gear S3 of the third gear set PG3 does not follow the input rotational fluctuation but acts as the reaction force element as indicated by the double lines. In a case where the pushing force of the spring 110 for zero-preload contact of the second brake BR2 is large, because rotation of the sixth rotational element F including the drum member of the second brake BR2 is restricted by this spring 110, the sixth rotational element F does not follow the rotational fluctuation input from the sun gear S3.

Accordingly, because the ring gear R3 and the sun gear S3 are in a fixed state in the third gear set PG3, the carrier C3 and the ring gear R4 of the fourth gear set PG4 which is integrally joined to the carrier C3 are also fixed. That is, the fifth to seventh rotational elements E to G act as reaction force elements against the output element I and thus cannot absorb the rotational fluctuation input to the carrier C4 of the fourth gear set PG4.

As a result, as described above, because the rotational fluctuation of the carrier C4 of the fourth gear set PG4 is not absorbed by the sun gear S4 side either, the rotational fluctuation is transmitted to the drive wheel side via the output shaft 13 and causes the vehicle-body vibration.

On the other hand, in the present embodiment, as illustrated in FIG. 6, the motive power connection-disconnection clutch CL0 is arranged between the engine E and the automatic transmission 10. As indicated by an arrow f in FIG. 4, in the idling condition, in a period until the range sensor detects an operation from a P(N) range to the D range (time points t0 to t3), the motive power connection-disconnection clutch CL0 is set to the released state. Accordingly, because the rotational fluctuation of the engine E is not transmitted to the automatic transmission 10, the vehicle-body vibration is prevented from occurring due to transmission of the rotational fluctuation of the engine E from the output side to the drive wheel side via the automatic transmission 10.

As illustrated in FIG. 4, at a time point t3 when the operation from the P(N) range to the D range is detected in the idling condition, in the present embodiment, when a fastening hydraulic pressure is supplied to the motive power connection-disconnection clutch CL0 and the first clutch CL1, the motive power connection-disconnection clutch CL0 is fastened, and the first clutch CL1 is fastened thereafter as indicated by arrows g in FIG. 4. Note that the motive power connection-disconnection clutch CL0 may include a structure which makes fastening earlier than the first clutch CL1. For example, the motive power connection-disconnection clutch CL0 may include a structure, which includes a spring urging the piston 44 to a fastening side so as to maintain the zero-clearance state, or the like.

At a time point t4 when the hydraulic pressure sensor or the like detects that the motive power connection-disconnection clutch CL0 and the first clutch CL1 are completely fastened, a hydraulic pressure lower than the fastening hydraulic pressure is supplied to the second brake BR2, and the plural friction plates 103 are set to the slip state as indicated by an arrow h in FIG. 4. Accordingly, although transmission of a driving force starts occurring, because the brake pedal is in an ON state, a zero-vehicle-speed (standstill) state is maintained.

Subsequently, at a time point t5 when the brake pedal is turned OFF, because the vehicle is released from a braking state by a brake, a creep state is caused by the slip state of the second brake BR2, and the vehicle starts traveling.

In addition, at a time point t6 when a travel-start acceleration request (for example, turning ON of the accelerator pedal) is detected, the fastening hydraulic pressure is supplied to the fastening hydraulic chamber 107 of the second brake BR2, and the plurality of friction plates 103 are fastened. In such a manner, the slip control is executed, and the vehicle thereby smoothly starts traveling or is accelerated.

As described above, because the motive power connection-disconnection clutch CL0 is fastened earlier than the second brake BR2 as the travel-start friction fastening element in a travel start of the vehicle, the slip control for the second brake BR2 in a travel start can be performed in a state where a torque is input, and fine slip control thereby becomes possible compared to a case where control is performed in a state where an input side is unstable.

Because the travel-start friction fastening element is configured with the second brake BR2 in which the friction plates on one side are fixed, compared to a clutch in which friction plates on both of input and output sides rotate, the slip control in a travel start is precisely performed, and better travel-start characteristics can thereby be obtained.

Because the piston is caused in advance to perform a stroke to a state where the piston contacts with the friction plate (zero-clearance state) by the spring 110 in a non-engaged state, responsiveness for a start of the slip control of the second brake BR2 in a vehicle travel start is improved, and good travel-start responsiveness of the vehicle can be obtained.

In the foregoing, the technique disclosed herein is described with the above-described embodiment; however, the technique disclosed herein is not limited to the above-described embodiment. For example, the travel-start shift stage of the automatic transmission may be formed by fastening of two friction fastening elements.

Further, for example, in the present embodiment, as the motive power connection-disconnection lutch CL0, a normally open type hydraulic clutch is used; however, a normally closed type hydraulic clutch may be used. In this case, the motive power connection-disconnection clutch may be released by an electric pump.

Further, for example, in the present embodiment, as illustrated in FIG. 4, the motive power connection-disconnection clutch CL0 is fastened at the time point t3 when the operation from the P(N) range to the D range is detected in the idling condition but may be fastened at the time point t2 at which transition is made to idling revolutions after complete combustion (see a broken line of the motive power connection-disconnection clutch CL0 in FIG. 4).

Further, for example, in the present embodiment, a timing of starting the slip control of the second brake BR2 as the travel-start friction fastening element is set to the time point t4 when the motive power connection-disconnection clutch CL0 and the first clutch CL1 are completely fastened but may be set to the time point t5 when the motive power connection-disconnection clutch CL0 and the first clutch CL1 are completely fastened and the brake pedal is released (see a broken line of the second brake BR2 in FIG. 4).

Further, for example, in the present embodiment, a description is made about inhibition of the vehicle-body vibration due to the rotational fluctuation of the engine in a forward travel start; however, similar effects can be obtained for a reverse travel start. In reverse traveling, as indicated by round brackets in FIG. 4, instead of the first clutch CL1 which is fastened in a travel start, the third clutch CL3 which is fastened in reverse traveling may be fastened.

It is also possible to perform various kinds of modifications and changes without departing from the spirit and scope of the present invention that are described in the claims.

REFERENCE CHARACTER LIST 1 powertrain device for vehicle
10 automatic transmission
210 spring (piston urging member)
BR2 second brake (travel-start friction fastening element)
CL0 motive power connection-disconnection clutch
CL1 to CL3, BR1, BR2 plural friction fastening elements
E engine

The invention claimed is:

1. A powertrain device for a vehicle, comprising:
an engine;
an automatic transmission; and
a motive power connection-disconnection clutch arranged between the engine and the automatic transmission, wherein
the automatic transmission includes a plurality of friction fastening elements for selectively switching motive power transmitting paths,
a predetermined friction fastening element among the plurality of friction fastening elements is a travel-start friction fastening element performing slip control in which the travel-start friction fastening element is completely fastened through a slip state in a travel start of the vehicle, and
the motive power connection-disconnection clutch is released at least in an engine start and is fastened earlier than the travel-start friction fastening element in the travel start.

2. The powertrain device for a vehicle according to claim 1, wherein
the motive power connection-disconnection clutch is maintained in a released state in a period in which the automatic transmission is in a neutral state after the engine start and is fastened in transition to a traveling range.

3. The powertrain device for a vehicle according to claim 2, wherein
the plurality of friction fastening elements are formed with a plurality of clutches and a plurality of brakes, and
the travel-start friction fastening element is a brake.

4. The powertrain device for a vehicle according to claim 3, wherein
the travel-start friction fastening element includes a piston urging member which forms a zero-clearance state in a non-engaged state.

5. The powertrain device for a vehicle according to claim 3, wherein
when the travel-start friction fastening element is fastened, a hydraulic pressure lower than a fastening hydraulic pressure is supplied to a fastening hydraulic chamber, a plurality of friction plates are thereby caused to reach the slip state, the fastening hydraulic pressure is thereafter supplied to the fastening hydraulic chamber, and the plurality of friction plates are fastened.

6. The powertrain device for a vehicle according to claim 5, wherein
when the travel-start friction fastening element is released, a hydraulic pressure lower than a releasing hydraulic pressure is supplied to a releasing hydraulic chamber, the plurality of friction plates are thereby caused to reach the slip state, the releasing hydraulic pressure is thereafter supplied to the releasing hydraulic chamber, and the plurality of friction plates are released from fastening.

7. The powertrain device for a vehicle according to claim 2, wherein
the travel-start friction fastening element includes a piston urging member which forms a zero-clearance state in a non-engaged state.

8. The powertrain device for a vehicle according to claim 7, wherein
in an idling condition, in a period until a range sensor detects an operation from a P or N range to a D range, the motive power connection-disconnection clutch is set to the released state, and at a time point when the operation from the P or N range to the D range is detected in the idling condition, when a fastening hydraulic pressure is supplied to the motive power connection-disconnection clutch and a first clutch of a plurality of clutches, the motive power connection-disconnection clutch is fastened, and the first clutch is fastened thereafter.

9. The powertrain device for a vehicle according to claim 2, wherein
in an idling condition, in a period until a range sensor detects an operation from a P or N range to a D range, the motive power connection-disconnection clutch is set to the released state, and at a time point when the operation from the P or N range to the D range is detected in the idling condition, when a fastening hydraulic pressure is supplied to the motive power connection-disconnection clutch and a first clutch of a plurality of clutches, the motive power connection-disconnection clutch is fastened, and the first clutch is fastened thereafter.

10. The powertrain device for a vehicle according to claim 1, wherein
the plurality of friction fastening elements are formed with a plurality of clutches and a plurality of brakes, and
the travel-start friction fastening element is a brake.

11. The powertrain device for a vehicle according to claim 10, wherein
the travel-start friction fastening element includes a piston urging member which forms a zero-clearance state in a non-engaged state.

12. The powertrain device for a vehicle according to claim 10, wherein
when the travel-start friction fastening element is fastened, a hydraulic pressure lower than a fastening hydraulic pressure is supplied to a fastening hydraulic chamber, a plurality of friction plates are thereby caused to reach the slip state, the fastening hydraulic pressure is thereafter supplied to the fastening hydraulic chamber, and the plurality of friction plates are fastened.

13. The powertrain device for a vehicle according to claim 12, wherein
when the travel-start friction fastening element is released, a hydraulic pressure lower than a releasing hydraulic pressure is supplied to a releasing hydraulic chamber, the plurality of friction plates are thereby caused to reach the slip state, the releasing hydraulic pressure is thereafter supplied to the releasing hydraulic chamber, and the plurality of friction plates are released from fastening.

14. The powertrain device for a vehicle according to claim 1, wherein
the travel-start friction fastening element includes a piston urging member which forms a zero-clearance state in a non-engaged state.

\* \* \* \* \*